No. 785,323. PATENTED MAR. 21, 1905.
J. NADROWSKI.
SPRING SHAFT.
APPLICATION FILED MAR. 24, 1904.
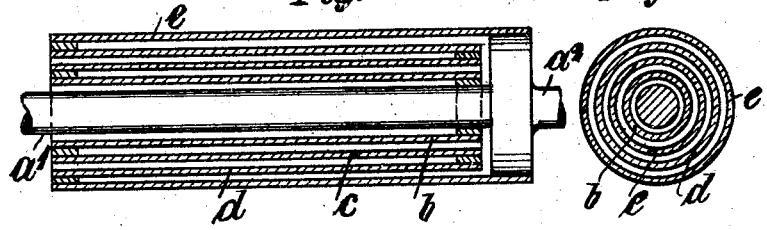
Witnesses.
Inventor:
Johannes Nadrowski
by Eustace D. Hopkins
Atty.

No. 785,323. Patented March 21, 1905.

UNITED STATES PATENT OFFICE.

JOHANNES NADROWSKI, OF DRESDEN, GERMANY.

SPRING-SHAFT.

SPECIFICATION forming part of Letters Patent No. 785,323, dated March 21, 1905.

Application filed March 24, 1904. Serial No. 199,774.

*To all whom it may concern:*

Be it known that I, JOHANNES NADROWSKI, a subject of the German Emperor, residing at Dresden, Saxony, Germany, have invented certain new and useful Improvements in Spring-Shafts, of which the following is a full, clear, and exact description.

The present invention relates to spring-shafts, and more particularly to that class of shaft employed in connection with dynamometers, although the invention may be utilized for other purposes. In many dynamometers hitherto employed the elastic parts are influenced to a great extent by the centrifugal force in connection with shafting rotating at high speeds, so that the results attained are more or less inaccurate. The most accurate measurements are generally attained by the employment of an inserted hollow or full piece of shafting, as in the case of the "Him" dynamometer, the power, as is known, being measured by torsion of the said inserted shaft. In these instruments, however, the piece of shafting inserted must be of considerable length in order to attain accurate results. The object of the present invention is to provide a piece of hollow shafting which shall render accurate results and at the same time be of restricted length. This is attained by combining a series of tubes of increasing diameter telescopically arranged and each member of the set being firmly fixed to the inside member at one end and to the outside member at the other end, the innermost tube being bolted to the driving-shaft and the outermost to the driven shaft, or vice versa.

In order to render the present specification easily intelligible, reference is had to the accompanying drawings, in which similar letters of reference denote similar parts throughout both views.

Figure 1 is a longitudinal section through the device, and Fig. 2 a cross-section.

In the embodiment of the invention illustrated the left-hand end of the shaft $a'$ is coupled in any suitable manner (not shown) to the driving-shaft, and to the right-hand end of this shaft is rigidly fixed one end of the innermost hollow shaft $b$. The opposite end of this shaft is rigidly fixed to one end of a second hollow shaft $c$, extending outside the innermost shaft and lying over the same. The right-hand end of this section is again rigidly attached to the end of another hollow shaft or tube $d$ and the left-hand end of this tube to the outside tube $e$, the right-hand end of the latter being fast to a disk or other part of the driven shaft $a^2$. From the above description it will be evident that the outside tube being coupled to the driven shaft and the inside one to the driving-shaft the device will register the sum of the torsional power exerted on each of the tube-sections and that consequently very accurate results will be attained with a comparatively short length of tubular shaft.

It will be obvious that any number of tube-sections may be employed.

Any suitable device may be employed for indicating or registering the amount of power generated.

I claim as my invention—

1. An elastic shaft consisting of a series of tubular sections arranged one inside the other and having one end of each section fixed to the corresponding end of the next lying outer section, the alternate ends of each section being left free and unattached as regards the next inclosing section or sleeve.

2. An elastic shaft consisting of a series of tubular sections arranged one inside the other and having one end of each section fixed to the corresponding end of the next lying outer section, the alternate ends of each section being left free and unattached as regards the next inclosing section and the innermost section being fixed to the driving and the outermost to the driven shaft in the manner and for the purpose substantially as described.

In witness whereof I have hereunto set my hand in presence of two witnesses.

JOHANNES NADROWSKI.

Witnesses:
PAUL E. SCHILLING,
PAUL ARRAS.